Nov. 12, 1974     M. H. COOPER     3,848,067
METHOD OF AND FILTER FOR REMOVING TRITIUM FROM INERT GASES
Filed July 12, 1972
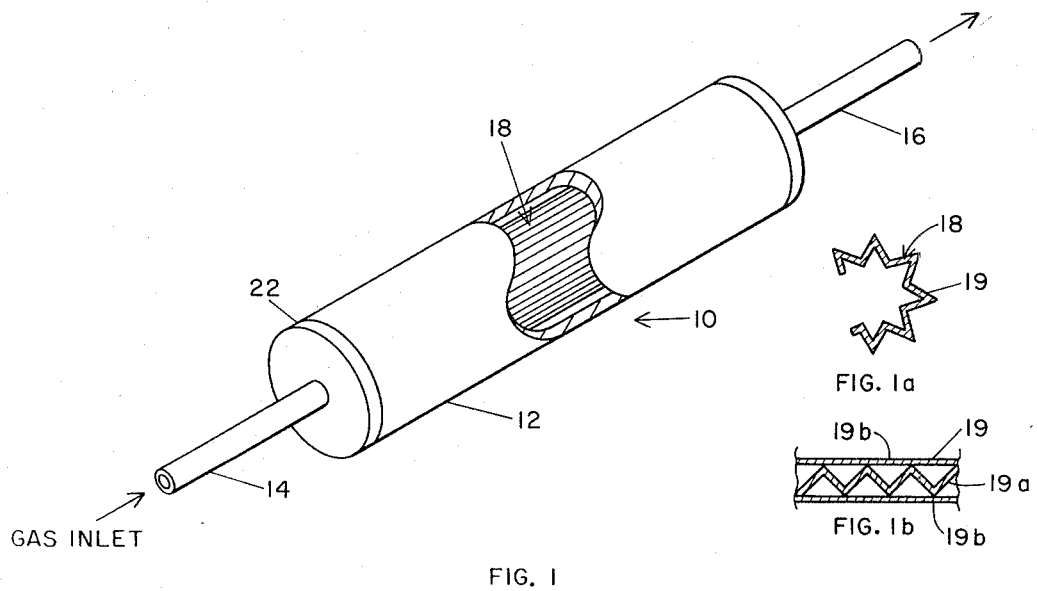
FIG. 1
FIG. 1a
FIG. 1b
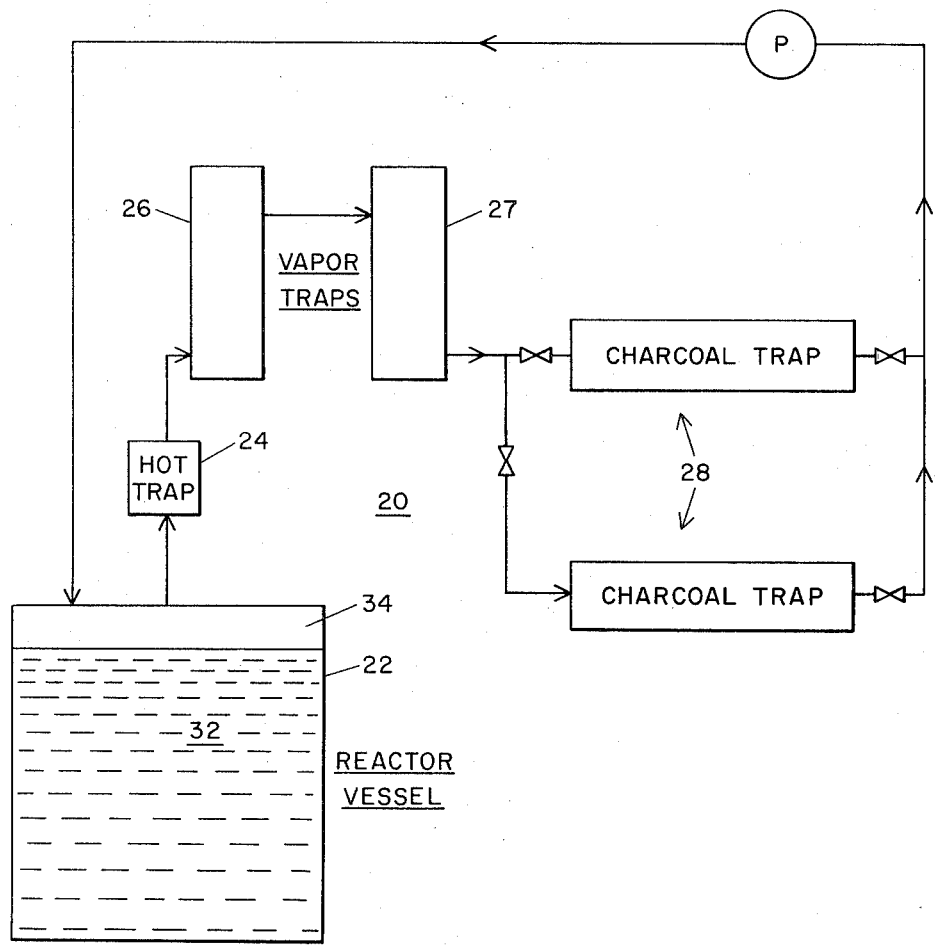
FIG. 2

United States Patent Office 3,848,067
Patented Nov. 12, 1974

3,848,067
METHOD OF AND FILTER FOR REMOVING TRITIUM FROM INERT GASES
Martin H. Cooper, Monroeville, Pa., assignor to the United States of America as represented by the United States Atomic Energy Commission
Filed July 12, 1972, Ser. No. 270,884
Int. Cl. B01d 53/34; B01j 11/22
U.S. Cl. 423—248                                4 Claims

ABSTRACT OF THE DISCLOSURE

A trap for removing tritium from an inert gas and method of doing the same comprising divided yttrium coated by nickel contacted by said gas.

SOURCE OF THE INVENTION

The invention described herein was made in the course of, or under a contract with the U.S. Atomic Energy Commission.

BACKGROUND OF THE INVENTION

In recent years there has been heightened interest in the safe removal and disposal of products released from nuclear reactors having any possible adverse effects on the environment, even at levels heretofore considered to be safe or acceptable.

One of the gaseous products of interest in tritium ($^3H$), which is a radioactive isotope of hydrogen, undergoing a beta decay with a half life of approximately 12 years. Since $^3H$ isotopically exchanges with $^2H$ in water, released $^3H$ rapidly enters the biological system. Hence is the necessity of preventing the tritium from being released into the environment.

It is known that this isotope of hydrogen results from the fission process within a nuclear reactor and diffuses through cladding and other materials, ultimately finding its way into coolants and the cover gases. In water-cooled reactors with stainless steel cladding, tritium readily diffuses through the fuel and cladding and isotopically exchanges with hydrogen in the primary coolant, so that essentially the complete production of tritium is released to the environment as $H^3HO$.

In the liquid metal fast breeder reactor (LMFBR), utilizing liquid sodium as the coolant and argon or helium as the cover gas, a substantial portion of the tritium produced ultimately appears in the cover gas, along with sodium vapor. In view of the high penetratability of the tritium it is necessary to remove it from the cover gas to insure that it does not find its way through the containment into the environment.

At the present time it appears there is no effective approach for removing tritium from a cover gas such as argon or helium in a reactor system. Efforts have been expended to produce a charcoal trap for this purpose and a so-called Nak bubbler to accomplish the same result while at the same time removing $O_2$ and $H_2O$ from the Ar. The charcoal adsorption trap only removes about 95% o fthe tritium while the Nak entrainment involves problems of the plugging of small lines, valves, etc., and possible cross-contamination when used for the both $^3H$ removal and that of $O_2$ and $H_2O$.

SUMMARY OF THE PRESENT INVENTION

The present invention involves the elimination of tritium from an inert gas such as argon or helium in a reactor system in which removal is attained up to 99.93%, with simplified handling and great efficiency.

In accordance with a preferred embodiment of this invention, the inert cover gas containing tritium is passed into contact with divided yttrium (Y) plated with nickel (Ni). The $^3H$ diffuses rapidly through the coating and reacts with the substrate to form $Y^3H_x$ where $x$ is any number up to 3 which exhibits the lowest H dissociation pressure of the reactive metals forming hydrides. The nickel permits rapid diffusion of $^3H$ while preventing diffusion of oxygen or carbonaceous gases which appear in trace amounts in the cover gas.

In another embodiment of this invention, a tritium filter is provided consisting of a bed of yttrium particles coated with nickel to permit the selective adsorption of this isotope.

In a further embodiment, there is provided a system for removing tritium from the cover gas in a LMFBR or other non-aqueous cooled reactor by reaction with nickel plated yttrium.

Other objects and advantages of this invention will hereinafter become obvious from the following description of preferred embodiments of this invention.

BRIEF DESCRIPTION OF THE FIGURES

FIG. 1 is an isometric view partially cut away of a trap constructed in accordance with the principles of this invention.

FIG. 1a is a cross sectional detail of a portion of the foil shown in FIG. 1.

FIG. 1b shows a cross-sectional detail of the foil shown in FIG. 1a.

FIG. 2 is a schematic view of a reactor system incorporating the principles of this invention.

DESCRIPTION OF THE PREFERRED EMBODIMENTS

In accordance with a preferred embodiment of this invention, the inert gas such as argon or helium containing tritium is passed through a trap containing yttrium in divided form coated with nickel. Referring to FIG. 1, there is shown a trap 10 consisting of a cylindrical body 12 with a gas inlet pipe 14 and a gas outlet pipe 16. Body 12 is filled with an yttrium foil assembly 18 plated on both sides by nickel, formed from a corrugated element 19 shown in FIG. 1a. For ease of removal and to facilitate flow of the gases therethrough, the absorbent element 19 of assembly 18 may be prepared by assembling one or more alternate corrugated sheets 19a of yttrium foil sandwiched between flat foil sheets 19b of yttrium as shown in FIG. 1b. This assembly may be rolled tightly into cylindrical form and inserted into body 12 from one end. One of the circular end plates 22 of body 12 is removable for this purpose. All of the yttrium is plated with nickel. Thickness of the yttrium foil is preferably in the range of 0.003–0.010 inch while the nickel plating is preferably in the range of 0.001–0.003 inch to insure against diffusion of $O_2$ or carbonaceous gas. Trap 10 should be operated at a temperature in the range of 1000–1400° F. Body 12 may be constructed from any austenitic stainless steel such as commercially available steels designated types 304, 310, 316 etc.

The corrugated construction has the advantage that it can be electroplated or vapor deposited with nickel with more assurance of a complete, even coating. Also, such construction lends itself to convenient fabrication.

Instead of the trap design illustrated in FIG. 1, it may also be possible to utilize the plated yttrium in a bed made up of chips, Raschig rings, cylinders, woven wires, or other standard packings used in gas contact equipment. Size of yttrium particles or elements selected would be determined by pressure drop and fluidizing considerations in the packed bed.

The trap shown in FIG. 1, is useful in a LMFBR or other non-aqueous cooled reactor system for the removal of tritium collected in the cover gas. For a preferred embodiment of such an arrangement, reference is made to FIG. 2, wherein is illustrated an inert cover gas purification system 20 consisting of reactor vessel 22, an yttrium hot trap 24 embodying principles of this invention, a pair of series arranged Na vapor traps 26 and 27, and a pair of parallel arranged charcoal traps 28. Reactor vessel 22 contains primary sodium 32 used in connection with operation of the reactor therein as is understood in the art and an inert cover gas 34, usually argon or helium, filling the space within vessel 22 above the level of the liquid sodium. The cover gas is circulated throughout the system in the direction shown by the arrows by a pump P in order to remove undesirable elements accumulating within cover gas 34.

It will be seen that the cover gas, upon leaving vessel 22, passes immediately through yttrium hot trap 24. Hot trap 24 may be identical to the design shown in FIG. 1 or one of the alternate designs noted above, but all providing for yttrium coated with nickel in the manner as previously described. The cover gas, having over 99.9% of the $^3H$ removed is then circulated through the Na vapor traps 26 and 27 to remove the sodium present and then through charcoal traps 28 to remove other contaminants present in the cover gas prior to being returned to reactor vessel 22. Typical temperatures of operation for the apparatus shown in FIG. 2 for a 300 MWe LMFBR gas purification system are as follows:

| | °F. |
|---|---|
| Cover gas in vessel 22 | 1050 |
| Yttrium hot trap 24 | 1050 |
| Na vapor trap 26 | 260 |
| Na vapor trap 27 | 110 |
| Charcoal traps 28 | −210 |

One of the principal features of this invention other than the high removal rate noted is that the only control required during operation is that of temperature. Yttrium hot trap 24 should be operated within the range of 1000–1400° F. The trap will operate effectively in a wide range of presure as removal is determined only by the partial pressure of $^3H$ in the gas and the equilibrium pressure of $^3H$ reacted with the yttrium. However, higher pressure operation does enhance the performance of the trap, since the $^3H$ in equilibrium with the $YH_x$ would be a smaller mole fraction of the total gas at higher pressures. Also, it will be seen that the trap of this invention is solid, simple, and inexpensive to construct, operate, and replace. In the event the $^3H$ is to be recovered for some other use, vacuum annealing of the Y will readily cause the release of the $^3H$ and $^1H$.

What is claimed is:

1. A method of removing tritium from an inert gas comprising the step of passing said gas into contact with solid yttrium plated with nickel at a temperature within the range of 1000–1400° F., the latter to prevent interfering corrosion of said yttrium while permitting the tritium to diffuse through and react with said yttrium.

2. The method according to claim 1 in which the thickness of the nickel plating is in the range of 0.001–0.003 inch.

3. The method according to claim 2 in which the yttrium is present in foil form whose thickness is in the range of 0.003–0.010 inch.

4. A tritium filter consisting essentially of solid yttrium in divided form, all exposed surfaces of said yttrium being plated with nickel to a thickness in the range of 0.001–0.003 inch.

No references cited.

EARL C. THOMAS, Primary Examiner

U.S. Cl. X.R.

423—262, 263; 176—37; 252—301.1, 466 J; 117—130 R, 100 M